United States Patent [19]

McWilliams et al.

[11] Patent Number: 4,518,653
[45] Date of Patent: May 21, 1985

[54] CHEMICALLY TREATED GLASS FIBERS FOR REINFORCING POLYMERIC MATERIALS AND PROCESSES

[75] Inventors: Donald E. McWilliams, Pittsburgh; Carl A. Melle, Gibsonia; Balbhadra Das, Allison Park, all of Pa.

[73] Assignee: PPG Industries, Inc., Pittsburgh, Pa.

[21] Appl. No.: 564,669

[22] Filed: Dec. 23, 1983

[51] Int. Cl.³ .............................................. D02G 3/00
[52] U.S. Cl. .................................... 428/378; 156/246; 427/389.8; 428/375; 428/391; 428/392; 428/396; 428/415
[58] Field of Search ............... 428/375, 378, 391, 392, 428/396, 415; 427/389.8, 289; 523/402, 408, 523/411; 156/246

[56] References Cited

U.S. PATENT DOCUMENTS

| | | | |
|---|---|---|---|
| 3,119,711 | 1/1964 | Starmann et al. | 428/378 |
| 3,207,623 | 9/1965 | Marzocchi et al. | 65/3 C |
| 3,249,411 | 5/1966 | McWilliams et al. | 65/3 C |
| 3,437,517 | 4/1969 | Eilerman et al. | 428/378 |
| 3,449,281 | 6/1969 | Sullivan et al. | 428/391 |
| 3,652,326 | 3/1972 | Ward | 428/391 |
| 3,772,870 | 11/1973 | Wong et al. | 428/378 |
| 3,888,645 | 6/1975 | Marzocchi | 428/378 |
| 4,039,716 | 8/1977 | Johnson | 428/391 |
| 4,104,434 | 8/1978 | Johnson | 65/3 C |
| 4,110,094 | 8/1978 | Motsinger | 65/3 C |
| 4,140,833 | 2/1979 | McCoy | 428/392 |
| 4,159,362 | 6/1979 | McCoy | 428/391 |

FOREIGN PATENT DOCUMENTS

| | | |
|---|---|---|
| 56713 | 8/1968 | Luxembourg . |
| 1103325 | 2/1968 | United Kingdom . |
| 1136548 | 12/1968 | United Kingdom . |
| 1503926 | 3/1978 | United Kingdom . |
| 1522715 | 8/1978 | United Kingdom . |

OTHER PUBLICATIONS

"Get Better Weathering Performance from RP Panel Formulations", by Matthew H. Naitvoe, Plastics Technology, Nov. 1981, p. 4.
"D.E.N. Epoxy Novalac Resins" from Dow Chemical Company.
"Neoxil® 952" Technical Literature from Savid, Como, Italy.
"Neoxil® 961" Technical Literature from Savid, Como, Italy.

Primary Examiner—James J. Bell
Attorney, Agent, or Firm—Kenneth J. Stachel

[57] ABSTRACT

Glass fiber strands are produced which have a reduced tendency for strand to strand adhesion and good dispersibility or wettability in uncured polymeric materials for the production of glass fiber reinforced plastics. The glass fibers have a dried residue of an aqueous chemical treating composition. The aqueous chemical treating composition has a film forming polymeric system, gamma methacryloxy alkyltrialkoxy silane and a glass fiber lubricant in an effective lubricating amount. The film forming polymeric system has an epoxy-containing polymer or copolymer, a non-tacky film forming polymer, and polyvinyl pyrrolidone of which are aqueous soluble, dispersible or emulsifiable. The amount of the epoxy-containing polymer or copolymer is in the range of about 50 to about 70 weight percent of the solids of the aqueous chemical treating composition while the amount of the polyvinyl pyrrolidone does not exceed 25 weight percent of the solids of the aqueous chemical treating composition and the amount of the non-tacky film forming polymer is in the range of about 5 to about 20 weight percent of the aqueous chemical treating composition.

20 Claims, 1 Drawing Figure

CHEMICALLY TREATED GLASS FIBERS FOR REINFORCING POLYMERIC MATERIALS AND PROCESSES

The present invention is directed to glass fibers treated with an aqueous chemical treating composition, where the fibers are ideal for use in reinforcing polymeric matrices for producing panels and particularly, translucent panels.

The reinforced plastic industry has been using glass fibers in various forms for reinforcing polymeric matrices to produce myriad products. For instance, glass fibers in the form of continuous and chopped filaments and strands and mats and rovings and woven and nonwoven fabrics reinforce both thermoplastic and thermosetting polymeric matrices in producing such products as sheet molding compound, bulk molding compound, injection molding products, spray up molding products and the like molding products.

In producing glass fibers for the polymeric reinforcement market, the glass fibers are attenuated from molten streams of fiberizable glass material from a bushing or a like device connected to a furnace containing molten fiberizable glass material. The glass fibers are attenuated by a winder which collects gathered filaments into a package or by rollers which pull the fibers before they are collected and chopped. In the process of producing glass fibers, there is a chemical treating composition applied to them shortly after they are attenuated from the molten streams of glass. The chemical treating composition is usually an aqueous composition, perhaps containing film forming materials, coupling agents and lubricants. The chemical treating composition is needed to retard interfilament abrasion of the glass fibers when they are gathered into a bundle of glass fibers or strands and to make the glass fibers compatible with polymeric matrices that they are to reinforce. Typically, the chemically treated glass fibers are dried either in the package form or in the chopped strand form before they are used for reinforcing polymeric matrices.

Clear or translucent plastic panels reinforced with glass fibers find applications in solar collectors, sky lights, patio covers, highway signs and markings and green house glazings. The production of translucent panels with glass fiber reinforcement demands that the glass fibers have particular characteristics over and above the glass fiber characteristics required in other reinforced polymeric products. For instance, the glass fibers must not reduce the clarity or weatherability of the panels, and the glass fibers must have adequate processability in the production of the panels so as to reduce any tendency for strand to strand adhesion in producing the panels and to disperse readily in the polymeric matrix in the allotted processing time.

It is an object of the present invention to provide chemically treated glass fibers that have a reduced tendency for strand to strand adhesion and good dispersibility or wettability in polymeric matrices in the production of glass fiber reinforced plastics and especially, clear or translucent glass fiber reinforced plastic panels.

SUMMARY OF THE INVENTION

Glass fibers of the present invention having the dried residue of an aqueous chemical treating composition present on a substantial portion of the surface of the fibers, which may be gathered into a bundle of fibers and/or strands, have a reduced tendency for strand to strand adhesion and have good dispersibility or wettability in polymeric matrices. The glass fibers have the dried residue of an aqueous treating composition having a film forming system with at least an epoxy-containing polymer or copolymer, non-tacky film forming polymer and polyvinyl pyrrolidone, wherein all of the film forming polymers within the aqueous film forming system are aqueous soluble, emulsifiable or dispersible and methacryloxy alkyl trialkoxy silane and a glass fiber lubricant, and water.

The epoxy-containing polymer or copolymer has an epoxy equivalent weight of about 180 to about 230 grams of resin for one gram of epoxide. The amount of the epoxy-containing polymer or copolymer present in the aqueous treating composition on a solids basis is in the range of about 50 to 70 weight percent. The non-tacky film forming polyer is either a polyester polymer prepared with bisphenol A as one of the monomers or an esterified epoxy polymer. The amount of the non-tacky film forming polymer is present in an amount of about 1 to about 20 weight percent of the solids of the aqueous treating composition. The amount of the polyvinyl pyrrolidone in the aqueous treating composition should not exceed about 25 weight percent of the solids of the aqueous treating composition and the ratio of the amounts on a solids basis of the epoxy-containing polymer or copolymer to the polyvinyl pyrrolidone should be in the range of about 2.5 to about 3.5. The amount of the silane coupling agent is about 0.1 to about 10 weight percent of the solids of the aqueous treating composition and the amount of the glass fiber lubricant is an effective lubricting amount and the amount of water is that amount to give a solids content for the aqueous treating composition in the range of about 1 to about 30 weight percent. The aqueous treating composition is essentially free of any hydrogenated vegetable oil.

The aqueous treating composition is applied to the glass fibers during formation of the glass fibers into bundles of glass fibers or strands and the bundles or stands are collected and dried at an elevated temperature not exceeding about 270° F. (132° C.). The drying removes a substantial amount of moisture from the treated fibers in the bundles and strands to result in a dried residue of the aqueous treating composition on the fibers and strands. The chemically treated glass fiber strands are chopped and applied to a matrix resin so that the fibers wet-out within the resin within about 5 to 10 minutes and the fiber containing polymeric matrix is cured to produce fiber reinforced plastic products.

DETAILED DESCRIPTION OF THE INVENTION AND PREFERRED EMBODIMENT

Figure 1:
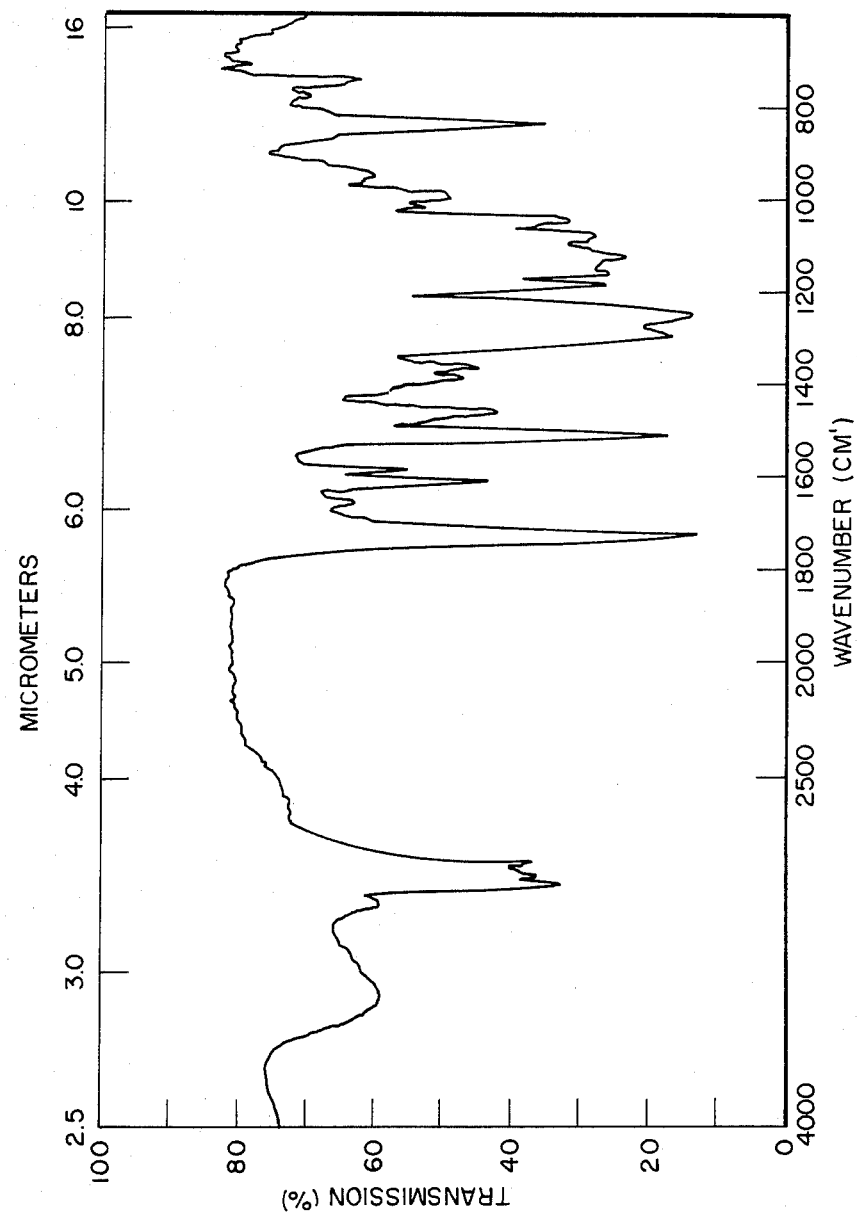
FIG. 1 is an infrared spectraphotometric curve of a dried film cast from a bisphenolic polyester resin in an aqueous emulsion commercially available under the trade designation Neoxil ® 952 from Savid.

Glass fiber reinforced polymers are produced into clear, translucent and pigmentable plastic panels, where the clear or translucent panels can be used in skylights, patio covers, highway signs and markings, solar collectors, and green house glazings, and where the pigmentable panels can be used in molding as sheet molding compound. The requirements that are necessary for the glass fibers to be used in such a matrix polymer for producing such products include good choppability and dispersibility in the matrix polymer, and fast wet-out and good solubility in the matrix polymer. In addition for clear or translucent panel production, the glass fibers must result in good clarity of the cured polymer panel and should not retard good weatherability of the cured polymer panel. Also for the production of pigmented panels, the glass fibers should have a low fiber prominence in the molded pigmented panel. For the choppability of the glass fibers in the form of bundles of glass fibers or strands of gathered glass fibers, the resulting bundles and/or strands should not have strand to strand adhesion, commonly referred to in the industry as matchsticking.

Matchsticking of the glass fiber bundles or strands would result in poor wet-out of the glass fiber in the polymeric matrix. Although the glass fibers of the present invention are most suitable for use in forming clear and translucent panels of glass fiber reinforced polymeric materials such as unsaturated polyesters and epoxies, the chemically treated glass fibers of the present invention can also be used in any polymeric matrix where there is a desirability to have the fast wet-out of the glass fibers in the polymeric matrix. "Wet-out" means that the uncured polymer when cured is the polymeric matrix that encapsulates the glass fibers and very little, if any, bare glass is visible throughout the cured fiber reinforced polymeric material. Wet-out during production of the cured glass fiber reinforced polymeric material is a measure of the apparent intimacy of contact between the uncured, polymeric material and the glass fibers. If the glass fibers are not intimately wet-out following the application of the glass fibers to the uncured polymeric material, adverse effects may result in processability, curing characteristics, and surface properties of the final cured fiber reinforced polymeric material. In processing of panels of fiber reinforced polymeric material, the wet-out of the chopped glass fiber strand or bundles of fibers must occur within a short time before the uncured polymeric material containing the chopped glass fibers is cured into the polymeric matrix along the processing line. Therefore, the speed of the wet-out of the chopped glass fiber strands or bundles of fibers is an improtant criteria in producing such products as clear or translucent panels for use in solar collectors and the like. Any retardation of the speed of wet-out of the chopped fiber strands would not be advantageous in the processing of panels of fiber reinforced polymeric materials.

A commercially available chemically treated glass fiber strand product made in accordance with U.S. Pat. No. 4,110,094 (Motsinger) assigned to the same assignee as this patent application, was used to produce panels of glass fiber reinforced acrylic polyesters. It was discovered that the panel product had good weatherability but was deficient in clarity and wet-out of the glass fiber strand and of matchsticking between the glass fiber strands. The chemically treated glass fiber strands had a dried residue of an aqueous treating composition having a 4,4' isopropylidene diphenol bisphenol-A-type epoxy resin, a reaction product of a partial ester of maleic anhydride and an epoxy resin containing one or more unesterified carboxyl groups and containing more than one epoxy, a propylene glycol-ethylene oxide surfactant, (F-108 surfactant), hydrogenated corn oil (Puroeco ® oil), polyethylene glycol emulsifier (Triton ® X-100), octylphenoxypolyethylene oxyethanol, polyvinyl pyrrolidone film former, methacryloxypropyltrimethoxy silane, acetic acid, fatty acid amine salt as a glass fiber lubricant (Emery ® 6717) and sufficient water to give a solids content in the range of about 6.5±0.2 percent.

It is believed, but the present invention is not limited by this belief, that many interrelating factors and functions associate with each other in producing chemically treated glass fibers, which have good wettability in the production of glass reinforced polymeric matrices, and which have good choppability and a reduced tendency for matchsticking and which produce panels of glass fiber reinforced polymetric matrices having not only good weatherability but also good clarity. For example, it has been discovered that the type of epoxy polymer and other film formers and the amounts of the epoxy polymer and the polyvinyl pyrrolidone and the ratio of these two materials used in the aqueous chemical treating composition are important in achieving the desired characteristics. Also, it was discovered that the absence of particular materials from the dried residue of the glass fibers of the present invention are necessary to achieve the desired charcteristics.

The chemically treated glass fibers of the present invention have the dried residue of an aqueous chemical treatment. The aqueous chemical treatment has an epoxy-containing polymer or copolymer which has an epoxy equivalent weight in the range of about 180 to about 230 grams of polymer for 1 gram equivalent of epoxide. The epoxy-containing polymer is emulsifiable, dispersable or solubilizable in water. The epoxy-containing polymer or copolymer functions to give good wettability to the treated glass fibers for fast wet-out of the glass fibers in polymeric matrices such as saturated and unsaturated polyesters and epoxies. Epoxy polymers with epoxy equivalent weights greater than about 230 grams of polymer for one gram equivalent of epoxide will produce a glass fiber reinforced polymeric panel that is hazy. If the epoxy equivalent weight is less than about 180 grams, the treated glass fibers are too sticky. The epoxy resin is used in an amount of about 50 to about 70 weight percent of the solids of the aqueous treating composition. The epoxy resins that can be used can be epoxy resins prepared from bisphenol A and a comonomer such as epihalohydrin to form the diglycidyl ether of the bisphenol A. Epoxy resins obtained by the use of hydroxyl compounds such as 4-isopropylidene bis(2,6-dibromophenol), dihydroxybenzenes, 1,1,2,2-tetra(p-hydroxy phenyl) ethane, 1,4-butane diol, glycerol, polyoxyalkylene (glycol), linoleic dimer acids, 1,1,3-tris(p-hydroxyphenyl)-propane and the like in reaction with epihalohydrin can also be used. Also, epoxy resins produced from aliphatic glycidyl ethers can be used. Also, epoxy resins produced by the reaction of monoepoxy compounds with themselves or other epoxy generating compounds can be used, for example, unsaturated monoepoxy compounds may be homopolymerized through the unsaturation to produce polyepoxy polymer like poly(allyl glycidyl ether). Particularly suitable epoxy resins are the phenolic epoxies which are obtained by the reaction of a stoichiometric excess of an epihalohydrin such as epichlorohydrin with a polyhydric phenol such as bis(4-hydroxyphenyl)-2,2propane, bis(hydroxyphenyl) methane which is obtained by the acid condensation of two moles of phenol with one mole of formaldehyde, hydroquinone, resorcinol or with polyhydroxy alcohol such as polyalkylene glycols, sorbitol, glycerol and the like. By varying these portions of the epihalohydrin, polyhydroxy compound and/or by varying the reaction conditions, compounds of low, intermediate or higher molecular weights may be produced which range from liquids to solids. The most preferred epoxy resin that is used is that available from Shell Chemical Corporation under the trade designation Epon ® 828 epoxy resin. Other commercially available epoxy resins that can be used are the epoxies available from Ciba-Geigy under the trade designation Araldite ® resins, from Dow Chemical Company under the trade designations D.E.R. or D.E.N. resins, the Epi-Rez ® resins avaiable from Celanese Polymer Specialties Company. A suitable epoxy-containing copolymer which can be used is the epoxidized polyvinyl acetate copolymer available from National Starch under the trade designation 1971 resin. The epoxy equivalent weight or epoxide equivalent which is defined as the weight of resin in grams which contains one gram equivalent of epoxy can be determined by any method known to those skilled in the art. Nonexclusive examples include infrared spectroscopy and wet analysis such as the titration method with sodium hydroxide after the addition of pyridinium chloride in pyridine to the epoxy polymer.

The aqueous soluble, dispersible or emulsifiable epoxy-containing polymer can have an emulsion or dispersion produced with any suitable surfactant known to those skilled in the art. For example, one or more surfactants which are condensates of ethylene oxide with hydrophobic bases formed by condensation with propylene oxide with propylene glycol can be used. For example, the Pluronic ® F-108 surfactant manufactured by BASF Wyandotte Industrial Chemical Group can be used to form a suitable emulsion or dispersion.

The film forming system of the aqueous chemical treating composition also has an aqueous soluble, dispersible or emulsifiable non-tacky film forming polymer. By non-tacky film forming polymer, it is meant that the polymer forms a non-tacky type film upon evawporation of water and any solvents or upon curing. The non-tacky film forming polymer contributes its non-tacky characteristics to the dried residue of the aqueous treating composition. The film of the dried residue of the aqueous treating composition has a less tacky characteristic than a film of the epoxy-containing polymer alone. Also, the film is tough and gives a nearly continuous film on the surface of the glass fibers. In achieving such a film characteristic, there is no penalty of reducing, to any great extent, the wettability given to the treated glass fibers by the epoxy-containing polymer. The nature of the film formed by the aqueous chemical treating composition with the non-tacky type film forming polymer is that glass fibers, when chopped into quarter inch lengths, have an apparent bulk density of greater than about 30 pounds/ft$^3$. The apparent bulk density test is conducted by any method known to those skilled in the art. A nonexclusive example of the apparent bulk desnity test is as follows.

First, a measured weight of chopped strands is poured into a 250 milliliter graduated cylinder. The cylinder is mounted into a bulk density tester like that available as J-M Bulk Density Tester from Richmond's Machine Company, East Main Street, Montpelier, Ohio 43543. The counter of the tester is set for 50 taps and the machine is started. After the machine stops, the volume of glass fibers in the graduated cylinder is read. The apparent bulk density is then calculated by dividing the weight of chopped strand by the volume reading after tapping. This figure is multiplied by 62.43 to obtain the apparent bulk density in pounds per cubic foot.

This non-tacky film forming polymer provides film characteristics in the dried residue of the aqueous treating composition on the glass fibers as does the epoxy-containing film forming polymer but without the concomitant tackiness which is provided by the epoxy-containing resin. Also, the presence of the non-tacky film former does not reduce the wettability of the treated glass fiber strands which results from the presence of the epoxy resin on the surface of the glass fibers. Also the presence of the non-tacky film forming polymer does not detrimentally affect the clarity of panels of a matrix polymer reinforced with glass fibers having the dried residue of the aqueous chemical composition. Nonexclusive examples of such non-tacky type film forming polymers include bisphenolic polyester resins such as those available in an aqueous emulsion form under the trade designation Neoxil ® 952 from Savid. FIG. 1 is an infrared spectraphotometric curve of a dried film cast from the Neoxil ® 952 material. The aqueous emulsion of the Neoxil ® 952 material is an anionic emulsion that has a liquid, milky appearance with a solid content of 40±2 percent and a pH in the range of 4 to 5. The viscosity at 23° C. is 40 to 100 centipoise and the lowest pH threshold value of the thinned emulsion (8 percent solids content) is 4. The Neoxil ® 952 material is very soluble in styrene and compatible with polyester resins. Another example of the non-tacky type film forming polymer is a high molecular weight saturated epoxy ester which is water soluble, emulsifiable or dispersible. Commercially available high molecular weight saturated epoxy ester in a water emulsion is available from Savid Company under the trade designation Neoxil ® 961 material. This material is a nonionic emulsion having a liquid milky appearance and a solids content of 30±2 percent and a pH in the range of 4 to 5.5 with a viscosity at 23° C. of 200 to 500 centipoise and the solid resin has a hydroxyl number of 100±10, an acid number of 10±2 and an epoxy equivalent of 9,000±1,000. Generally, any of the bisphenol type polyester resins which are saturated or unsaturated and which are soluble, emulsifiable or dispersible in water with anionic, nonionic or cationic emulsifiers can be used as the non-tacky type film forming polymer in the present invention. Also, generally any esterified epoxy resin which is water soluble, emulsifiable or dispersible by anionic, nonionic or cationic emulsifier can be used as the non-tacky type film forming polymer. The esterification of epoxy resins can be performed by reaction with carboxylic acids to esterify the epoxy group to form the hydroxy ester, although any other reaction known to those skilled in the art for producing epoxy esters or esterifying epoxy resins can be used. The non-tacky type film forming polymer is used in the film forming system of the aqueous chemical treating composition rather than having the full compliment of the film forming system comprised of epoxy-containing polymer or copolymer. The solubility of the non-tacky type film forming polymer in the epoxy-containing polymer furthers the compatibility of the two polymers or polymeric emulsions. This compatibility assists in achieving a reduction in the tackiness of the film of the dried residue of the aqueous treating composition on the glass fibers over that of glass fibers having a dried residue of just epoxy-containing polymer. The reduction in tackiness translates into a reduction in matchsticking of the chopped treated glass fiber strands due to strand to strand adhesion. The amount of the non-tacky film forming polymer in the aqueous treating composition is in the range of about 1 to about 20 weight percent of the solids of the aqueous treating composition.

The third film forming polymer in the film forming polymer system of the aqueous treating composition is a polyvinyl pyrrolidone polymer. By the term "a polyvinyl pyrrolidone" it is meant any homopolymer obtained by the addition polymerization of a monomer which may be represented by the formula:

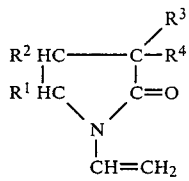

wherein $R^1$, $R^2$, $R^3$, $R^4$ may each be hydrogen or lower alkyls. Examples of such monomers include N-vinyl-2-pyrrolidone, 5-methyl-N-vinyl-2-pyrrolidone, 4-methyl-N-vinyl-2-pyrrolidone, 5-ethyl-N-vinyl-2-pyrrolidone, 4-ethyl-N-vinyl-2-pyrrolidone, 3-methyl-N-vinyl-2-pyrrolidone, 3-ethyl-N-vinyl-2-pyrrolidone, 3,3-dimethyl-N-vinyl-2-pyrrolidone, 3,5-dimethyl-N-vinyl-2-pyrrolidone, and the like. These monomers and their homopolymerization products are known in the art. It is preferred that the polyvinyl pyrrolidone have an average molecular weight of from about 5,000 to 100,000. The amount of the aqueous soluble, dispersible or emulsifiable polyvinyl pyrrolidone present in the aqueous treating composition should not exceed about 25 weight percent of the solids of the aqueous treating composition. Also, the ratio of the polyvinyl pyrrolidone to the epoxy-containing polymer or copolymer in the film forming system should be in the range of about 2.5 to about 3.5 based on the weight percent solids of these materials. The polyvinyl pyrrolidone functions to increase the integrity of the fibers in the strand, but amounts of the polyvinyl pyrrolidone in excess of 25 weight percent of the solids would degrade the properties of polymeric panels reinforced with the glass fibers. The major property which would be degraded would be the clarity of the panel. The ratio of the epoxy-containing polymer or copolymer to the polyvinyl pyrrolidone is important so that the glass fiber having the dried residue of the aqueous treating composition have good choppability but a reduced tendency for match-sticking of the chopped glass fiber strands.

In addition to the film forming system, the aqueous chemical treating composition also has present one coupling agent which is a methacryloxy alkyl trialkoxy silane. The alkoxy group and the alkyl group have from one to five carbon atoms and preferably, one to two carbon atoms for the alkoxy group and three carbon atoms for the alkyl group. Preferably, the methacryloxyalkyl trialkoxy silane is methacryloxypropyltrimethoxy silane. The methoxy groups of the methacryloxypropyltrimethoxy silane must by hydrolyzed before the silane is incorporated into the aqueous treating composition. This is accomplished by adding an essentially hydrocarbon organic acid such as acetic acid to the coupling agent and stirring for a sufficient time and at a sufficient temperature to hydrolyze a substantial amount of the $SiOCH_3$ group to form methanol and $Si(OH)_3$ groups. Sufficient water is used in the hydrolysis to impart sufficient activity to the acetic acid. The amount of silane coupling agent used in the aqueous treating composition is in the range of about 0.1 to about 10 weight percent of the solids of the aqueous treating composition. In addition to the foregoing components of the aqueous chemical treating composition, there is a glass fiber lubricant in an effective lubricating amount. The lubricants are those which impart lubricity to the glass fibers and gathered bundles of glass fibers and strands and preferably are water soluble cationic materials. Examples include acid solubilized, fatty acid amides such as stearic amide. The fatty acid amides are both saturated and unsaturated and the acid group contains from 4 to 24 carbon atoms. Also, anhydrous acid solubilized polymers of the lower molecular weight unsaturated fatty acid amides are included. Also useful are the alkyl imidazoline derivatives which include compounds of the class, alkyl-N-amido alkyl imidazolines, which are formed by reaction of fatty acids with polyalkylene polyamines under conditions to produce ring closure. The preferred lubricant is a partially amidated polyamine material having the trade designation Emerylube ® 6717 available from Emery Chemical Company. Another suitable material is manufactured under the trade designation Cirrasol ® 95A which is an anhydrous material with a deep reddish amber color which is a viscous liquid at room temperature. It is water dispersible and a one percent solution has a pH of about 8.9 to about 9.4. When the cationic water soluble glass fiber lubricant contains a reactable nitrogen group, the effective amount of the lubricant should be limited to prevent any substantial crosslinking of the epoxy-containing polymer to a greater epoxy equivalent weight than about 230 by the nitrogen-containing groups of the glass fiber lubricant. Generally, the effective amount of the glass fiber lubricant is in the range of about 0.05 to about 0.5 weight percent of the aqueous chemical treating composition.

The aqueous chemical treating composition is essentially free of several components. The film forming system is essentially free of any insoluble polyvinyl acetate homopolymer which may reduce the wet-out characteristics of treated glass fibers. Also, the aqueous treating composition is essentially free of any material that would act as epoxy curing agents in amounts that would crosslink the epoxy-containing polymer or copolymer to have a epoxy equivalent weight of greater than about 230. In addition, the aqueous chemical treating composition is essentially free of any materials which would not be solubilizable in the epoxy-containing polymer or copolymer. Such a material is the nonionic water insoluble hydrocarbon glass fiber lubricants such as hydrogenated hydrocarbon oil. Typically, the water insoluble lubricant is a hydrogenated or saturated fatty acid ester of glycerol and the aqueous chemical treating composition is essentially free of these types of materials.

The aqueous chemical treating composition has a sufficient amount of water to give a total solids for the composition in the range of about 1 to about 30 weight percent and preferably about 5 to about 10 weight percent. The pH of the aqueous chemical treating composition is in a range of about 3.5 to about 7 to maintain the stability of the composition. The aqueous chemical treating composition can be made by combining the components simultaneously or sequentially. Where materials have to be dispersed or emulsified it is preferred to first prepared the emulsion or dispersion before adding the material to form the aqueous chemical treating composition.

The aqueous chemical treating composition can be applied to any fiberizable glass material such as "E-glass", "621-glass" and low or free boron and/or fluorine derivatives thereof and glass fiber compositions known as "A-glass", "C-glass", and "S-glass". It is preferred when preparing chemically treated glass fibers to be used in the manufacture of clear or translucent fiber reinforced polymeric panels that the fiberizable glass composition should result in glass fibers which give a blue hue or cast when they are used to reinforce the acrylic polyester matrix resins. Preferably, the glass fiber compositions give a refractive index for the glass fibers in the range of about 1.549 to about 1.557. the aqueous chemical treating composition can be applied to the glass fibers by any method known to those skilled in the art such as during the formation of the glass fibers after the glass fibers have cooled to a sufficient temperature to allow the application of the aqueous chemical treating composition. The aqueous chemical treating composition, typically referred to as a sizing composition, is applied to these glass fibers by applicators having belts, rollers, sprays and the like. The treated glass fibers then can be gathered into one or more strands and collected into a package commonly referred to as a forming package. Also, the glass fibers can be collected into one or more strands and chopped as a wet chop product. Also, the glass fibers can be gathered into one or more strands and collected as a roving. No matter what the form of the chemically treated glass fibers, they are dried to remove a substantial amount of the moisture. For example temperature and time conditions equivalent to a temperature of about 240° F. for 11 hours can be used. The drying can be accomplished in any conventional glass fiber drying oven such as forced air ovens, dielectric ovens, and the like. The dried glass fibers have a dried residue of the aqueous chemical treating composition present on the surfaces of the glass fibers making up the strands. Preferably, the dried residue has less than about 0.1 percent by weight of moisture.

The dried glass fibers having the residue of the chemical treating composition can be used in any process for producing glass fiber reinforced polymers, when the polymer can be, for example, saturated and unsaturated polyesters and epoxies. One process in which the glass fibers are particularly suitable is the formation of clear or translucent acrylic polymer glass fiber reinforced panels. With the high speed commercial operations used in producing glass fiber reinforced clear and translucent panels, the glass fibers with the dried residue of the chemical treating composition of the present invention is ideally suited. The glass fibers when chopped have very good wet-out in the polymeric matrix within the limitations of the high speed operation for producing the panels. The glass fibers with the dried residue of the aqueous chemical treating composition can be supplied to such an operation as dry chopped glass fiber strand or as roving which is then chopped into the curable polymeric material which is traveling on a conveyor belt on a releasable substrate such as cellophane. The chopped glass fiber strands are dispersed somewhat uniformly over the curable polymeric material and the glass fibers settle and become wet-out in the curable polymeric material. The glass fiber containing curable polymeric material is then cured in a suitable oven to produced the glass fiber reinforced panels. The panels have good clarity with little fiber prominence.

In the preferred embodiment of the present invention, glass fibers having a refractive index in the range of about 1.549 to about 1.555 are coated with the aqueous chemical treating composition during the formation of the glass fibers from a multitude of orifices in a bushing of a glass-melting furnace. The aqueous chemical treating composition has an epoxy polymer formed from bisphenol A and epichlorohydrin with an epoxy functionality of 180 to about 230 grams of polymers per one gram equivalent epoxide and which is available from Shell Chemical Company under the trade designation Epon ® 828. The epoxy polymer is emulsified with the nonionic surfactant, that is, a condensate of ethylene oxide with hydrophobic bases formed by condensing propylene oxide with propylene glycol and available from BASF Wyandotte, Industrial Chemical Group, Wyandotte, MI under the trade designation Pluronic ® F108. Also, the aqueous chemical treating composition has an aqueous emulsion of an epoxy ester polymer available from Savid under the trade designation Neoxil ® 961 polymer emulsion or the aqueous emulsion of a bisphenolic polyester available from Savid under the trade designation Neoxil ® 952 polymer emulsion. Also, the film forming polymer system has the polyvinyl pyrrolidone which is present in an amount to give a ratio of the epoxy polymer to the polyvinyl pyrrolidone polymer of preferably around 2.8. The amount of the epoxy polymer is preferably in the range of about 50 to 60 weight percent based on the solids of the aqueous chemical treating composition. The surfactant that is used to emulsify the epoxy polymer is present in an amount of around 5.5 to 6.5 weight percent of the solids of the aqueous chemical treating composition. The amount of the nontacky film forming polymer which is soluble in the epoxy polymer is in the range of about 5 to about 15 weight percent of the solids of the aqueous chemical treating composition. The amount of the polyvinyl pyrrolidone, which is preferably the K-30 variety of polyvinyl pyrrolidone that is a homopolymer of N-vinyl-2-pyrrolidone having an average molecular weight of about 40,000, does not exceed about 25 weight percent of the solids of the aqueous chemical treating composition. Preferably the amount is in the range of about 15 to about 25 weight percent of the solids. The preferred silane coupling agent is the gamma methacryloxypropyltrimethoxy silane available from Union Carbide Corporation under the trade designation A174 silane, and the amount of the A174 silane is preferably in the range of about 2.5 to 4 weight percent of the solids of the aqueous chemical treating composition. The water soluble cationic glass fiber lubricant is preferably the amidated polyamine available as Emerylube ® 6717 which is present in an amount of about 2 to about 2.5 weight percent of the solids of the aqueous chemical treating composition. The water which is present to make up the aqueous chemical treating composition is that amount to give a total solids most preferably around 5 weight percent of the aqueous chemical treating composition. The pH of the aqueous chemical treating composition is preferably in the range of about 5.5 to about 5.9.

The aqueous chemical treating composition is prepared by adding the epoxy resin and the surfactant together and heating until the surfactant dissolves which is at a temperature of around 120° to 140° F. (48° C. to 60° C.) and the epoxy resin is emulsified slowly with an Eppenbach ® homogenizer. The polyvinyl pyrrolidone is dissolved in hot water (120° F. to 160° F.) and is added to the epoxy emulsion. The non-tacky film forming polymer which is soluble in the epoxy polymer and is emulsified is diluted about 2 to 1 and added to the mixture. The methacryloxypropyltrimethoxy silane is hydrolyzed with acetic acid in an amount of about 1 milliliter of acetic acid for 200 grams of the silane and the hydrolyzed silane is added to the mixture. The glass fiber lubricant is dissolved in warm water (120° F. to 140° F.) and is added to the mixture. Water, which is preferably deionized water, is added to the mixture to bring it to the desired final volume. The pH, if not within the range of about 5.5 to about 5.9, can be adjusted with acetic acid.

Preferably, the aqueous chemical treating composition is applied to green glass during the formation of the glass fibers which have a diameter which can range from about 10.3 to about 97.5 or more $10^{-5}$ inches and preferably is around 35 to $40 \times 10^{-5}$ inches. The glass fibers are split into four strands of about 400 filaments per strand to give a G-67 four-way split strand. The aqueous chemical treating composition is applied to the glass fibers to give an add-on of the chemical treating composition in the range of about 0.5 to about 8 percent LOI (Loss on Ignition). The strands of glass fibers are collected on a winder to produce a roving package and a plurality of the roving packages are dried in a Michigan oven at a temperature in the range of about 200° to 240° F. for 11 hours. The roving can then be used in a process for producing clear or translucent acrylic polyester or epoxy panels by chopping the roving into chopped strand having a length of about ⅛ of an inch to 2 inches, preferably 1 inch. The chopped strands fall into the curable polymeric material which is present on a moving conveyor having a release substrate such as cellophane separating the polymeric material from the conveyor belt. The chopped glass fiber strand containing curable polymeric material is conveyed to an oven where the panels are heated at a temperature to cure the polymeric material into a fiber reinforced polymeric matrix.

To further illustrate the invention, the following illustrative examples and examples 4, 5, and 6 are presented. The aqueous chemical treating composition used in the illustrative examples and examples 4, 5, and 6 were prepared in a similar manner to that described in the preferred embodiment except for the absence or addition of added materials. The glass fibers were formed and treated with the aqueous chemical treating composition in a manner similar to that described for the preferred embodiment. The construction of the glass fibers into strands varies from that of the preferred embodiment and is noted in Table 1. The panels of acrylic polyester reinforced with the dried glass fiber strands of the illustrative examples and examples 4, 5, and 6 were prepared in a manner similar to that of the preferred embodiment. Table 1 gives result of the preparation of glass fibers treated with the aqueous chemical treating composition according to the present invention in examples 4, 5, and 6. Also Table 1 gives illustrative examples 1, 2 and 3 where the glass fibers are treated with an aqueous chemical treating composition not in accordance with the present invention. Illustrative example 1 has the epoxy polymer and the polyvinyl pyrrolidone without the non-tacky film forming polymer which is soluble in the epoxy polymer. Illustrative example 2 of Table 1 has glass fibers having the dried residue of the aqueous chemical treating composition having only the non-tacky film forming polymer which is the epoxy ester type without the presence of an epoxy polymer. Illustrative Example 3 shows glass fibers treated with the chemical treating composition having the bisphenolic polyester type non-tacky film forming polymer without the presence of the epoxy polymer. Table 1 shows the improvement given by the glass fibers of the present invention compared to the glass fibers of the illustrative examples. The matchsticking and clarity of panels reinforced with the glass fibers of the present invention in examples 4, 5 and 6 have improved performance over the same characteristics of the illustrative examples 1, 2 and 3.

TABLE 1

COMPONENTS OF AQUEOUS CHEMICAL TREATING COMPOSITION AND PERFORMANCE OF TREATED GLASS FIBERS

| Components of Chemical Treating Composition | Illustrative Example 1 gm per 75.5 l/wt % wet/wt % dry | Illustrative Example 2 gm per 18.9 l/wt % wet/wt % dry | Illustrative Example 3 gm per 18.9 l/wt % wet/wt % dry |
|---|---|---|---|
| Aqueous emulsifiable epoxy polymer (Epon 828 resin) | 2400/3.2/67.04 | —/—/— | —/—/— |
| Surfactant (Pluronic F-108 surfactant) | 260/0.3/7.3 | —/—/— | —/—/— |
| Polyvinyl pyrrolidone (K-30) | 720/0.95/20.1 | 180/0.95/26.5 | 180/0.95/21.7 |
| Gamma methacryloxypropyltrimethoxy silane (A-174 silane) | 200/.26/3.4 | 50/0.16/4.4 | 50/0.16/3.6 |
| Acetic acid | 1 cc | — | — |
| Glass fiber lubricant (Emerylube ® 6717) | 80/0.1/2.2 | 20/0.1/2.9 | 20/0.1/2.4 |
| Aqueous epoxy ester polymer emulsion (Neoxil ® 961 polymer with 30 ± 2% solids) | —/—/— | 1500/2.4/66.2 | —/—/— |
| Aqueous bisphenolic polyester emulsion (Neoxil ® 952 polymer with 40 ± 2% solids) | —/—/— | —/—/— | 1500/3.17/72.3 |
| Water | 71.9 l | 18.26 l | 18.1 l |
| Glass fibers treated with chemical | K-37/G-67.5 | K-37/G-67.5 | K-37/G-67.5 |

TABLE 1-continued

COMPONENTS OF AQUEOUS CHEMICAL TREATING COMPOSITION AND PERFORMANCE OF TREATED GLASS FIBERS

| | | | |
|---|---|---|---|
| Matchsticking of chopped glass fiber strands | Better than Illustrative Example 2 | Moderate | More than Ill. Eg #2 |
| Clarity of cured panels of unsaturated polyester and chopped glass fiber strand | Very Good | N/A | N/A |

| Components of Chemical Treating Composition | Example 4 gm per 75.5 l/wt % wet/wt % dry | Example 5 gm per 75.7 l/wt % wet/wt % dry | Example 6 gm per 75.7 l/wt % wet/wt % dry |
|---|---|---|---|
| Aqueous emulsifiable epoxy polymer (Epon 828 resin) | 2000/2.65/55.9 | 2000/2.65/57.8 | 2000/2.64/53.6 |
| Surfactant (Pluronic F-108 surfactant) | 216/0.28/6.0 | 216/0.28/6.2 | 216/0.28/5.8 |
| Polyvinyl pyrrolidone (K-30) | 720/0.95/20.1 | 720/0.95/20.8 | 720/0.95/19.3 |
| Gamma methacryloxypropyltrimethoxy silane (A-174 silane) | 200/0.16/3.4 | 200/0.16/3.5 | 200/0.16/3.2 |
| Acetic acid | 1 cc | 1 cc | 1 cc |
| Glass fiber lubricant (Emerylube ® 6717) | 80/0.11/2.2 | 80/0.1/2.3 | 80/0.1/2.2 |
| Aqueous epoxy ester polymer emulsion (Neoxil ® 961 polymer with 30 ± 2% solids) | 1480/1.95/12.4 | 1080/0.43/9.4 | —/—/— |
| Aqueous bisphenolic polyester emulsion (Neoxil ® 952 polymer with 40 ± 2% solids) | —/—/— | —/—/— | 1480/0.78/13.9 |
| Water | 71.9 l | 71.9 l | 71.9 l |
| Glass fibers treated with chemical | K-37/G-67.5 | K-37/G-67.5 | K-37/G-67.5 |
| Matchsticking of chopped glass fiber strands | Good | Better than Illus. Example 1 | Better than Illus. Example 1 |
| Clarity of cured panels of unsaturated polyester and chopped glass fiber strand | Very good | Very good | Very good |

We claim:

1. Glass fiber strands having a plurality of glass fibers where each glass fiber has at least a portion of its surface covered with the dried residue of an aqueous chemical treating composition, comprising:
   a. a film forming polymeric system, comprising:
      1. an aqueous soluble, emulsifiable or dispersible epoxy-containing polymer or copolymer having an epoxy equivalent weight in the range of about 180 to about 230 grams of polymer per one gram of equivalent epoxide and present in the aqueous chemical treating composition in an amount of about 50 to about 70 weight percent of the solids of the aqueous chemical treating composition.
      2. an aqueous soluble, emulsifiable or dispersible nontacky film forming polymer which is compatible in the epoxy-containing polymer,
      3. polyvinyl pyrrolidone in an amount of not greater than 25 weight percent of the solids of the aqueous chemical treating composition,
   b. methacryloxy alkyltrialkoxy silane coupling agent,
   c. cationic glass fiber lubricant in an effective lubricating amount,
   d. water in an amount to give a total solids in the range of about 1 to about 30 weight percent, wherein the aqueous chemical treating composition is essentially free of glass fiber lubricants which are water insoluble, hydrogenated or saturated fatty acid esters of glycerol or vegetable oils.

2. Glass fibers of claim 1, wherein the epoxy-containing polymer or copolymer is present in an aqueous emulsion prepared with one or more surfactants which are condensates of ethylene oxide with hydrophobic bases formed by condensation of propylene oxide with propylene glycol.

3. Glass fiber strands of claim 2. wherein the epoxy resin is a phenolic epoxy formed by the reaction of a stoichiometric excess of an epihalohydrin with bis(4-hydroxyphenyl)-2,2-propane, bis(hydroxyphenyl) methane.

4. Glass fibers of claim 1, that are chopped glass fiber strands having an apparent bulk density of greater than 30 pounds per cubic foot.

5. Glass fiber strands of claim 1, wherein the nontacky film forming polymer is selected from the group consisting of bisphenolic polyester resins and high molecular weight saturated epoxy ester polymers.

6. Glass fiber strands of claim 3, wherein the amount of the non-tacky film forming polymer is in the range of about 1 to about 20 weight percent of the solids of the aqueous chemical treating composition.

7. Glass fiber strands of claim 1, wherein the nontacky film forming polymer yields a dried film having an infrared absorption spectra of FIG. 1.

8. Glass fiber strands of claim 1, wherein the nontacky film forming polymer is present in an aqueous emulsion and is a bisphenolic polyester resin in an anionic emulsion having a solids content of around 40 percent and a pH in the range of 4 to 5 and a viscosity at 23° C. in the range of 40 to 100 centipoise.

9. Glass fiber strands of claim 1, wherein the non-tacky film forming polymer is a high molecular weight saturated epoxy ester in a nonionic aqueous emulsion having a solids content of around 30 percent and a pH in the range of 4 to 5.5 and a viscosity at 23° C. of around 200 to around 500 centipoise where the epoxy resin polymer has a hydroxyl number of around 90 to 110 and an acid number of around 8 to 12 and an epoxy equivalent weight of around 8,000 to 10,000.

10. Glass fiber strands of claim 1, wherein the polyvinyl pyrrolidone has an average molecular weight in the range of about 5,000 to 100,000 and is present in an amount to give a ratio of the polyvinyl pyrrolidone to the epoxy-containing polymer or copolymer in the film forming system in the range of about 2.5 to about 3.5 based on the weight percent solids of the polymers.

11. Glass fiber strands of claim 1, wherein the methacryloxy alkyltrialkoxy silane is methacryloxy propyltrimethoxy silane which is hydrolyzed and present in an amount of about 0.1 to about 10 weight percent of the solids of the aqueous treating composition.

12. Glass fiber strands of claim 1, wherein the cationic glass fiber lubricant is a partially amidated, polyalkyl amine formed by the reaction of a mixture of fatty acids having about 2 to about 18 carbon atoms and a polyamine polymer having a molecular weight of about 1200 where the reaction product has a residual amine value of from about 300 to 400 and the amount of this glass fiber lubricant is in the range of about 0.05 to about 0.5 weight percent of the aqueous chemical treating composition.

13. Glass fiber strands of claim 1, wherein the dried residue of the aqueous chemical treating composition has a moisture content of about 0.01 to about 0.1 weight percent of the glass fiber strands.

14. Glass fiber strands of claim 1, wherein the amount of the dried residue on the glass fiber strands is in the range of about 0.5 to about 8 weight percent of the glass fiber strands.

15. Glass fiber strands of claim 1, wherein the film forming polymer system is essentially free of any poly(vinyl acetate) homopolymer.

16. Glass fiber strands of claim 1, wherein the glass fibers without the dried residue of the aqueous chemical treating composition have a refractive index in the range of about 0.549 to about 1.557.

17. Glass fiber strands having a plurality of glass fibers, where each glass fiber has at least a portion of its surface covered with the dried residue of an aqueous chemical treating composition, comprising:
a. a film forming polymeric system, comprising:
 1. an aqueous emulsion of an epoxy-containing polymer or copolymer having an epoxy equivalent weight in the range of about 180 to about 230 grams of polymer per one gram of equivalent epoxide present in a sufficient quantity to give an amount of the polymer in the aqueous chemical treating composition in the range of about 50 to about 70 weight percent of the solids of the aqueous chemical treating composition, wherein the emulsion is formed with one or more surfactants which are condensates of ethylene oxide with hydrophobic bases formed by condensation of propylene oxide with propylene glycol,
 2. an aqueous emulsion of a non-tacky film forming polymer selected from the group consisting of an anionic aqueous emulsion of a bisphenolic polyester resin and a nonionic emulsion of a high molecular weight saturated epoxy ester wherein the amount of the emulsions in the aqueous chemical treating composition is sufficient to give an amount of the polymer in the range of about 1 to about 20 weight percent of the solids of the aqueous chemical treating composition,
 3. polyvinyl pyrrolidone in an amount to give a ratio of the polyvinyl pyrrolidone to the epoxy-containing polymer or copolymer in the film forming system in the range of about 2.5 to about 3.5 based on the weight percent solids of the polymers,
b. methacryloxy propyltrimethoxy silane coupling agent,
c. partially amidated polyalkylene amine cationic lubricant in an effective lubricating amount,
d. water in an amount to give a total solids in the range of about 1 to about 30 weight percent wherein the aqueous chemical treating composition is essentially free of glass fiber lubricants selected from the group consisting of water insoluble or hydrogenated or saturated fatty acid esters of glycerol, or vegetable oils.

18. Glass fiber strands of claim 17, wherein the dried residue is present in an amount of about 0.5 to about 8 weight percent of the treated glass fiber strands.

19. Glass fiber strands of claim 17, wherein the glass fibers without the aqueous chemical treating composition have a refractive index in the range of about 1.549 to about 1.557.

20. Method of forming fiber reinforced polymeric materials having good clarity and weatherability, comprising:
A. preparing chemically treated glass fibers, wherein the glass fibers have applied to them an aqueous chemical treating composition so that at least a portion of the surface of each glass fiber is covered with the treating composition where the composition has:
 a. a film forming polymer system, comprising:
  1. an aqueous soluble, emulsifiable or dispersible epoxy-containing polymer or copolymer having an epoxy equivalent weight in the range of about 180 to about 230 grams of polymer per one gram of equivalent epoxide and present in the aqueous chemical treating composition in an amount of about 50 to about 70 weight percent of the solids of the aqueous chemical treating composition,
  2. an aqueous soluble, emulsifiable or dispersible non-tacky film forming polymer which is compatible in the epoxy-containing polymer,
  3. polyvinyl pyrrolidone in an amount of not greater than 25 weight percent of the solids of the aqueous chemical treating composition,
 b. methacryloxy alkyltrialkoxy silane coupling agent,
 c. cationic glass fiber lubricant in an effective lubricating amount,
 d. water in an amount to give a total solids in the range of about 1 to about 30 weight percent, wherein the aqueous chemical treating composition is essentially free of glass fiber lubricants which are water insoluble, hydrogenated or saturated fatty acid esters of glycerol or vegetable oils,
B. chopping the glass fiber strands,
C. applying the chopped glass fiber strands to a matrix resin, wherein the glass fibers wet-out within the resin within 5 to 10 minutes, and
D. curing the glass fiber containing polymeric matrix to produce the fiber reinforced polymeric material.

* * * * *

UNITED STATES PATENT AND TRADEMARK OFFICE
CERTIFICATE OF CORRECTION

PATENT NO. : 4,518,653

DATED : May 21, 1985

INVENTOR(S) : Donald E. McWilliams et al.

It is certified that error appears in the above-identified patent and that said Letters Patent is hereby corrected as shown below:

Column 13, line 51, after the word "composition", delete the period and insert therefor --,--.

Signed and Sealed this

Tenth Day of September 1985

[SEAL]

Attest:

DONALD J. QUIGG

Attesting Officer     Acting Commissioner of Patents and Trademarks - Designate